May 28, 1935.  H. ISELIN  2,003,050
BEER CONTAINER AND COOLER
Filed Sept. 15, 1933
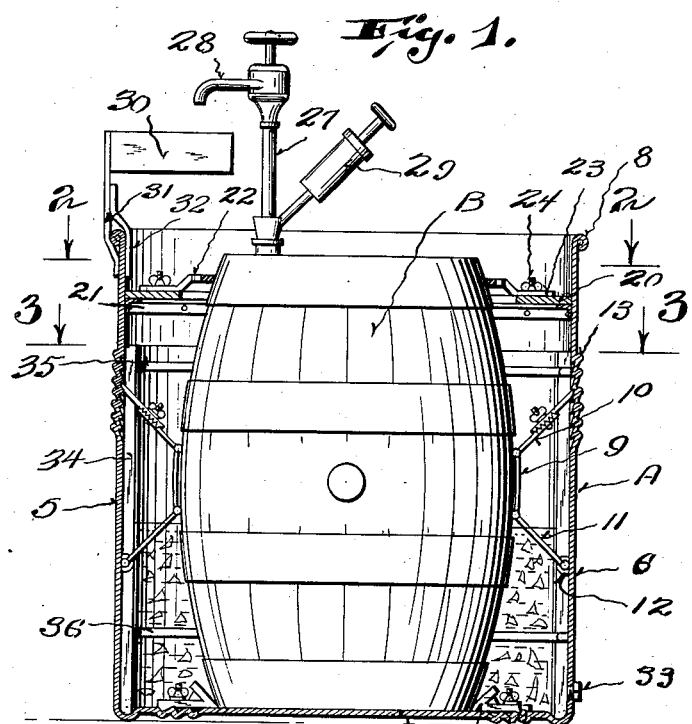
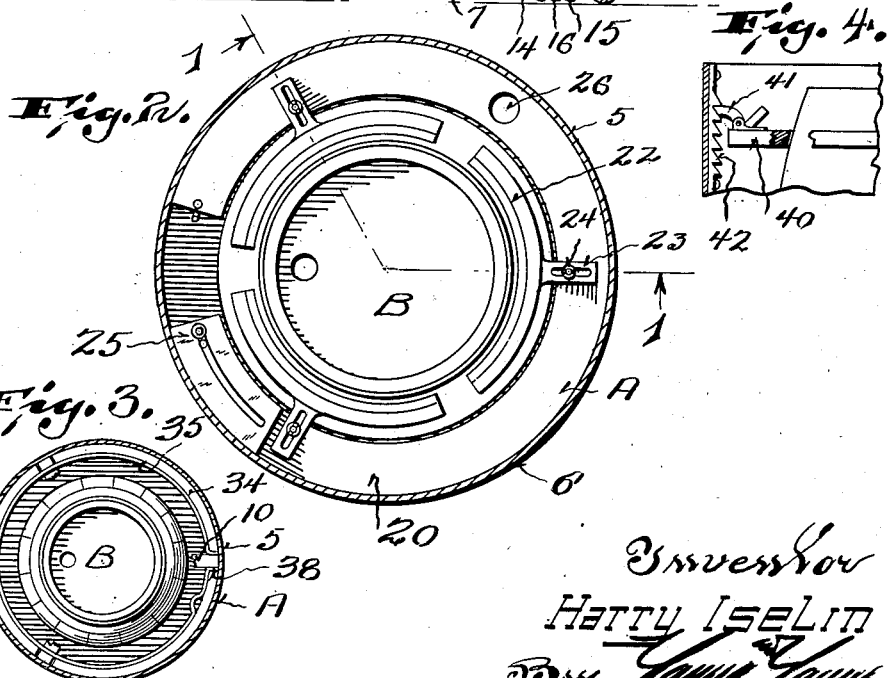
Inventor
Harry Iselin
By
Attorneys Patented May 28, 1935

2,003,050

UNITED STATES PATENT OFFICE 2,003,050

BEER CONTAINER AND COOLER

Harry Iselin, Racine, Wis.

Application September 15, 1933, Serial No. 689,594

6 Claims. (Cl. 62—32)

This invention appertains to liquid coolers and more particularly to a cooling device for kegs of beer and the like.

One of the primary objects of my invention is the provision of a novel device for cooling the beer directly in the keg or barrel entirely dispensing with the necessity of cooling coils and the like, the device being of a portable nature, whereby the same is particularly adapted for use on picnics, for use in the home, etc.

Another salient object of my invention is the provision of a beer cooler, which can be furnished by a brewery with the keg of beer completely iced, etc., ready for consumption, whereby the difficulty generally contingent with dispensing draft beer in the home or on a picnic is eliminated.

A further important object of my invention is the provision of a beer cooler embodying a tank or external container for receiving the barrel of beer with novel locking means for detachably holding the barrel in place in the container against accidental movement, the container being adapted to receive the refrigerant, such as ice, whereby the contents of the barrel can be conveniently cooled.

A further object of my invention is the provision of novel means for centering the barrel or keg in the container with novel means for closing the top of the container around the barrel or keg, so as to prevent undue melting of the refrigerant, the closure being adapted to detachably support the tap rod, pump and the like during transit of beer and the container and prior to the tapping of the keg or barrel.

A further object of my invention is the provision of means for detachably connecting a drip pan with the container below the dispensing faucet carried by the tap rod, the drip pan being readily removable from the container and being adapted to be placed within the container when the container is being moved.

A further object of my invention is the provision of novel means for insulating the lower part of the container and novel means for holding the insulation in place.

A still further object of my invention is to provide an improved beer cooler of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which:—

Figure 1 is a vertical section through my improved device, the view being taken substantially on the line 1—1 of Figure 2 looking in the direction of the arrows, the figure illustrating a barrel in place therein and being cooled and set up for dispensing beer.

Figure 2 is a horizontal section taken on the line 2—2 of Figure 1 looking in the direction of the arrows.

Figure 3 is a horizontal section taken on the line 3—3 of Figure 1, the view being taken on a reduced scale.

Figure 4 is a fragmentary vertical section illustrating a slightly modified form of means for holding the top plate or cover in position.

Referring to the drawing in detail, wherein similar reference characters designate the corresponding parts throughout the several views, the letter A generally indicates my improved cooler for a barrel or keg B.

The barrel or keg B forms no part of my invention and can be of any conventional construction, such as a wooden or metal barrel.

My improved cooler A comprises a tank or container 5 preferably formed from metal and of sufficient size to receive a keg or barrel of beer. This tank or container 5 embodies a cylindrical side wall 6 and a bottom wall 7. The upper edge of the side wall 6 may be reinforced by a rolled bead 8.

When the barrel or keg of beer B is to be cooled, the same is placed centrally within the container 5, as is clearly shown in the drawing, and the refrigerant is placed within the container around the lower end of the barrel.

I have provided novel means for detachably clamping the barrel in place, so as to firmly hold the barrel against movement when the same is being carried from one place to another. This clamping means includes a barrel engaging jaw 9 having pivotally connected to its opposite ends legs 10 and 11. The lowermost leg 11 is pivotally connected as at 12 to the inner face of the side wall of the container. The other leg 10 is preferably formed adjustable as to length and the outer end of the same is adapted to detachably engage any one of a series of teeth 13, which may be struck out or formed in the side wall 6 of the container. As shown, these clamping devices are arranged at spaced points around the container.

Obviously, by pushing down on the arms 10, the jaws 9 can be brought into firm contact with the sides of the barrel.

In order to center the barrel and to further aid in holding the barrel against movement, the bottom of the container can be provided with sliding wedges 14, which are movable toward and away from the axial center of the container. These wedges are held in place in any preferred manner, such as by the use of a lug 15 engaging any one of a series of ratchet or like teeth 16 on the bottom of the container. A holding bolt and thumb nut can be employed for holding each wedge against the bottom of the container.

To prevent undue melting of the refrigerant and to also facilitate the centering of the keg or barrel within the container, I provide an annular top plate or cover 20, which extends around the upper end of the barrel. This top plate can be rigidly secured to or placed against a retaining ring 21 riveted or welded to the inner face of the side wall of the container. As shown, this ring 21 is of an angle shape in cross section.

Adjustably carried by the plate 20 are a plurality of spaced arcuate clamping jaws for gripping the upper end of the barrel. As shown, each of the jaws 22 have outwardly directed arms 23 through which extends a holding bolt 24. If so desired, the jaws can be provided with rubber or like gripping faces.

A pivoted or sliding cover 25 can be associated with the cover plate 20, so as to facilitate the placing of the refrigerant within the container. This plate is also provided with an opening 26 which is adapted to receive the tap rod 27, when the same is not in use. This tap rod 27 has operatively connected thereto a dispensing spigot 28 and an air pump 29. The air pump 29 is employed for creating pressure within the barrel or keg, so as to facilitate the forcing of the beer from the barrel or keg upon the opening of the faucet. A drip pan 30 can also be provided and this drip pan carries resilient gripping jaws 31 and 32 for engaging the upper end of the container. When the container and barrel is being moved, the drip pan can be placed on top of the cover plate or placed directly within the container.

A drain plug 33 can be carried by the lower end of the container, so that the melted water from the ice can be conveniently drained therefrom.

If preferred, the side wall of the container can be suitably heat insulated and as shown in Figures 1 and 3 of the drawing, arcuate sections of insulation 34 can be placed against the inner surface of the side wall 6 of the container. This insulation can be formed from wood, if preferred, and resilient wire clamping rings 35 and 36 are employed for holding the same in place. The ends of the rings 35 and 36 can be provided with laterally extending feet 38 which are adapted to be disposed between adjacent edges of the arcuate sections of insulation. The sections of the insulation are spaced, so as to accommodate the clamping jaws 9 heretofore referred to.

Obviously, other means can be employed for holding the cover plate in position and in Figure 4, I have illustrated such a modified means. In this form, I provide a cover plate 40, which is adapted to snugly engage the upper end of the barrel. This plate at spaced points carries outwardly extending spring pressed latches 41, which are adapted to engage in any one of a series of ratchet teeth formed on rack bars 42 secured to the inner face of the container.

From the foregoing description, it can be seen that I have provided a simple and novel means for icing or cooling an entire keg or barrel of beer and which is of such a form that the same can be readily moved from place to place with the keg.

Changes in details may be made without departing from the spirit or the scope of my invention, but what I claim as new is:—

1. A device for cooling the contents of a barrel comprising a container for receiving the entire barrel said container having an open upper receiving end, clamping means carried by the container for engaging and centering the barrel within the container, the container being adapted to receive a refrigerant, and a cover plate disposed within the upper end of the container around the barrel to expose the upper end to view and to permit the contents thereof to be drawn off.

2. A device for cooling the contents of a barrel comprising a container for receiving the entire barrel said container having an open upper receiving end, clamping means carried by the container for engaging and centering the barrel within the container, the container being adapted to receive a refrigerant, an annular cover plate disposed within the upper end of the container around the barrel to expose one end to view, the cover plate having a door whereby to facilitate the placing of the refrigerant within the container around the barrel.

3. A device for cooling the contents of a barrel comprising a container formed from sheet metal for receiving the barrel, adjustable centering wedges carried by the bottom wall of the container for engaging the bottom end of the barrel, adjustable clamps carried by the side wall of the container for engaging an intermediate portion of the barrel, and an annular cover plate disposed within the container for engaging about the barrel and having means for gripping the upper end of the barrel.

4. A device for cooling the contents of a barrel comprising a sheet metal container for receiving the entire barrel, the side walls of the container being provided with integral rack bars, barrel gripping jaws disposed at spaced points around the container, oppositely extending arms pivotally connected to the opposite ends of the jaws, means for pivotally connecting certain of the arms to the container, the other of said arms being provided with teeth for engaging in selected teeth of the rack bars.

5. A device for cooling the contents of a barrel comprising a sheet metal container for receiving the entire barrel, the side walls of the container being provided with integral rack bars, barrel gripping jaws disposed at spaced points around the container, oppositely extending arms pivotally connected to the opposite ends of the jaws, means for pivotally connecting certain of the arms to the container, the other of said arms being provided with teeth for engaging in selected teeth of the rack bars, said last mentioned arms being adjustable as to length.

6. In a device for cooling the contents of a barrel, a container for receiving the entire barrel, means carried by the container for gripping and centering a barrel therein, arcuate sections of insulation placed against the inner faces of the side wall of the container, and resilient removable open clamping rings engaging the inner faces of the sections of insulation, the ends of the open rings being provided with laterally extending feet for engaging between facing edges of adjacent sections of insulation.

HARRY ISELIN.